United States Patent
Shechter et al.

(10) Patent No.: US 8,932,770 B2
(45) Date of Patent: Jan. 13, 2015

(54) ELECTRODES FOR USE IN BACTERIAL FUEL CELLS AND BACTERIAL ELECTROLYSIS CELLS AND BACTERIAL FUEL CELLS AND BACTERIAL ELECTROLYSIS CELLS EMPLOYING SUCH ELECTRODES

(75) Inventors: Ronen Itzhak Shechter, Kiryat Tivon (IL); Eytan Baruch Levy, Rosh Ha'ayin (IL); Lior Eshed, Nesher (IL)

(73) Assignee: Emefcy Limited, Caesarea (IL)

( * ) Notice: Subject to any disclaimer, the term of this patent is extended or adjusted under 35 U.S.C. 154(b) by 618 days.

(21) Appl. No.: 13/124,535

(22) PCT Filed: Nov. 1, 2009

(86) PCT No.: PCT/IL2009/001017
§ 371 (c)(1),
(2), (4) Date: May 9, 2011

(87) PCT Pub. No.: WO2010/049936
PCT Pub. Date: May 6, 2010

(65) Prior Publication Data
US 2011/0229742 A1 Sep. 22, 2011

Related U.S. Application Data

(60) Provisional application No. 61/198,027, filed on Oct. 30, 2008, provisional application No. 61/182,727, filed on May 31, 2009.

(51) Int. Cl.
| | | |
|---|---|---|
| H01M 8/16 | (2006.01) | |
| C25B 9/00 | (2006.01) | |
| H01M 4/86 | (2006.01) | |
| C02F 1/461 | (2006.01) | |
| C02F 3/00 | (2006.01) | |
| C02F 3/10 | (2006.01) | |
| H01M 4/90 | (2006.01) | |

(52) U.S. Cl.
CPC ............. *H01M 4/86* (2013.01); *C02F 1/46109* (2013.01); *C02F 3/005* (2013.01); *C02F 3/103* (2013.01); *H01M 4/90* (2013.01); *H01M 8/16* (2013.01); *C02F 2001/46138* (2013.01); *C02F 2001/46157* (2013.01); *C02F 2001/46166* (2013.01); *C02F 2201/4611* (2013.01); *C02F 2201/4619* (2013.01); *C02F 2303/10* (2013.01); *Y02E 60/527* (2013.01)
USPC ................................. 429/401; 429/2; 429/531

(58) Field of Classification Search
CPC ........... H01M 8/16; H01M 4/86; H01M 4/90; C02F 1/46109; C02F 3/005
USPC .............................................. 429/401, 2, 531
See application file for complete search history.

(56) References Cited

U.S. PATENT DOCUMENTS

| | | | |
|---|---|---|---|
| 2002/0098398 A1* | 7/2002 | Chen ............................... | 429/18 |
| 2003/0180622 A1 | 9/2003 | Tsukuda et al. | |

(Continued)

FOREIGN PATENT DOCUMENTS

| | | |
|---|---|---|
| CN | 101028952 A | 9/2007 |
| JP | 2001-145896 A | 5/2001 |

(Continued)

OTHER PUBLICATIONS

"Resistivity and Temperature Coefficient at 20 C." Table of Resistivity. Georgia State University—Department of Physics and Astornomy, n.d. Web. Jan. 15, 2014. <http://hyperphysics.phy-astr.gsu.edu/hbase/tables/rstiv.html>.*

(Continued)

*Primary Examiner* — Edu E Enin-Okut
(74) *Attorney, Agent, or Firm* — Sughrue Mion, PLLC (57) ABSTRACT

A bacterial fuel cell including a plurality of anodes and a plurality of cathodes in liquid communication with a liquid to be purified, the plurality of anodes and the plurality of cathodes each including a metal electrical conductor arranged to be electrically coupled across a load in an electrical circuit and an electrically conductive coating at least between the metal electrical conductor and the liquid to be purified, the electrically conductive coating being operative to mutually seal the liquid and the electrical conductor from each other.

13 Claims, 10 Drawing Sheets

(56) References Cited

U.S. PATENT DOCUMENTS

| | | | | |
|---|---|---|---|---|
| 2004/0091763 A1* | 5/2004 | Drake | | 429/34 |
| 2007/0048577 A1* | 3/2007 | Ringeisen et al. | | 429/30 |
| 2007/0259217 A1* | 11/2007 | Logan | | 429/2 |
| 2009/0297890 A1* | 12/2009 | Shimomura et al. | | 429/2 |

FOREIGN PATENT DOCUMENTS

| | | | | |
|---|---|---|---|---|
| JP | 2001145896 A * | 5/2001 | | C02F 3/34 |
| JP | 2007-095471 A | 4/2007 | | |
| WO | WO 2007037228 A1 * | 4/2007 | | H01M 4/86 |
| WO | 2010/049936 A1 | 5/2010 | | |

OTHER PUBLICATIONS

Stejskal et al., "Polyaniline. Preparation of a Conducting Polymer" (IUPAC Technical Report). Pure Appl. Chem., vol. 74, No. 5, pp. 857-858, 2002.*

Machine translation for Ichikawa et al., JP 2001-145896 A.*

An English Translation of an Office Action dated Apr. 25, 2013 which issued during the prosecution of Israel Patent Application No. 212312.

An Office Action dated Oct. 16, 2013, which issued during the prosecution of U.S. Appl. No. 13/541,089.

An Office Action together with the English translation dated May 28, 2013 which issued during the prosecution of Chinese Patent Application No. 200980147975.4.

An English translation of Office action dated Aug. 20, 2013 which issued during the prosecution of Japanese Patent Application No. 533933/2011.

An Office Action dated Nov. 29, 2012, which issued during the prosecution of New Zealand Patent Application No. 592492.

An International Preliminary Report on Patentability dated May 3, 2011, which issued during the prosecution of Applicant's PCT/IL09/01017.

An International Search Report and a Written Opinion both dated Feb. 24, 2010, which issued during the prosecution of Applicant's PCT/IL09/01017.

An Office Action dated Nov. 6, 2012, which issued during the prosecution of Mexican Patent Application No. MXa2011004321.

An Office Action dated May 4, 2012, which issued during the prosecution of New Zealand Patent Application No. 592492.

Microbial Fuel Cells: Methodology and Technology, Bruce E. Logan et al, Environ. Sci. Technol., 40 (17), 5181-5192, 2006.

Microbial Fuel Cells—Challenges and Applications, Bruce E. Logan & John M. Regan, Environ Sci. Tech., vol. 40, 17, 2006.

Stefano Freguia, Korneel Rabaey, Zhiguo Yuan, Jurg Keller, Non-catalyzed cathodic oxygen reduction at graphite granules in microbial fuel cells, Electrochimica Acta 53 (2007) 598-603.

Hong Liu et al., Quantification of the internal resistance distribution in microbial fuel cells, Environmental Science and Technolog,. 2008, 42 (21), pp. 8101-8107.

* cited by examiner

ELECTRODES FOR USE IN BACTERIAL FUEL CELLS AND BACTERIAL ELECTROLYSIS CELLS AND BACTERIAL FUEL CELLS AND BACTERIAL ELECTROLYSIS CELLS EMPLOYING SUCH ELECTRODES

CROSS REFERENCE TO RELATED APPLICATION

This application is a National Stage of International Application No. PCT/IL2009/001017 filed Nov. 1, 2009, claiming priority based on U.S. Provisional Patent Application Nos. 61/198,027, filed Oct. 30, 2008 and 61/182,727 filed May 31, 2009, the contents of all of which are incorporated herein by reference in their entirety.

REFERENCE TO RELATED APPLICATIONS

Reference is made to applicant's U.S. Provisional Patent Application Ser. No. 61/198,027 filed Oct. 30, 2008 and entitled Electrodes For Microbial Fuel Cells And Microbial Electrolysis Cells, the disclosure of which is hereby incorporated by reference and priority of which is hereby claimed pursuant to 37 CFR 1.78(a) (4) and (5)(i).

Reference is made to applicant's U.S. Provisional Patent Application Ser. No. 61/182,727 filed May 31, 2009 and entitled Microbial Fuel Cell, the disclosure of which is hereby incorporated by reference and priority of which is hereby claimed pursuant to 37 CFR 1.78(a) (4) and (5)(i).

FIELD OF THE INVENTION

The present invention relates to bioelectric chemical devices generally and more particularly to bacterial fuel cells and bacterial electrolysis cells.

BACKGROUND OF THE INVENTION

The following publications are believed to represent the current state of the art:

Microbial Fuel Cells: Methodology and Technology, Brace E. Logan et al, Environ. Sci. Technol., 40 (17), 5181-5192, 2006.

Microbial Fuel Cells—Challenges and Applications, Bruce E. Logan & John M. Regan, Environ Sci. Tech., Vol. 40, 17

Stefano Freguia, Korneel Rabaey, Zhiguo Yuan, Jurg Keller, Non-catalyzed cathodic oxygen reduction at graphite granules in microbial fuel cells, Electrochimica Acta 53 (2007) 598-603

Hong Liu et al., Quantification of the internal resistance distribution in microbial fuel cells, Environmental Science and Technology US published patent application 20070259217

SUMMARY OF THE INVENTION

The present invention seeks to provide improved bioelectric chemical devices and more particularly to provide improved bacterial fuel cells and bacterial electrolysis cells.

There is thus provided in accordance with a preferred embodiment of the present invention a bacterial fuel cell including a plurality of anodes and a plurality of cathodes in liquid communication with a liquid to be purified, the plurality of anodes and the plurality of cathodes each including a metal electrical conductor arranged to be electrically coupled across a load in an electrical circuit and an electrically conductive coating at least between the metal electrical conductor and the liquid to be purified, the electrically conductive coating being operative to mutually seal the liquid and the electrical conductor from each other.

There is also provided in accordance with another preferred embodiment of the present invention a bacterial fuel cell including a plurality of anodes and a plurality of cathodes in liquid communication with a liquid to be purified, the plurality of anodes and the plurality of cathodes each including a metal electrical conductor arranged to be electrically coupled across a load in an electrical circuit and an electrically conductive coating at least between the metal electrical conductor and the liquid to be purified, the electrically conductive coating operative to mutually seal the liquid and the electrical conductor from each other, at least two of the cathodes being arranged adjacent each other and being separated from each other by a gap filled with an oxygen-containing gas.

In accordance with a preferred embodiment of the present invention the bacterial fuel cell also includes at least one surface adapted for biofilm growth on a surface thereof which is in liquid communication with the liquid to be purified and is in electrical communication with the metal electrical conductor via the electrically conductive coating. Preferably, the at least one surface adapted for biofilm growth is defined by a fabric overlying a surface of the electrically conductive coating.

In accordance with a preferred embodiment of the present invention the metal electrical conductor is a coated metal electrical conductor and the electrically conductive coating includes an electrically conductive coating formed onto the metal electrical conductor. Additionally or alternatively, the electrically conductive coating includes an electrically conductive sheet.

Preferably, the electrically conductive coating of at least one of the plurality of cathodes includes a water-permeable electrically conductive sheet.

Preferably, the coated metal electrical conductor of at least one of the plurality of cathodes is water permeable.

Preferably, at least one of the plurality of cathodes includes an attachment layer. More preferably, the attachment layer is formed of a plastic fabric.

In accordance with a preferred embodiment of the present invention apertures are formed in the plurality of anodes and cathodes and the bacterial fuel cell includes conduits defined between adjacent cathodes and volumes defined between adjacent cathodes and anodes providing communication of the liquid to be purified with the plurality of anodes and the plurality of cathodes, the apertures providing communication of the liquid to be purified between the conduits and the volumes.

In accordance with a preferred embodiment of the present invention the plurality of anodes and cathodes are formed as embossed elements. Preferably, the plurality of anodes and cathodes are sealed together.

There is yet further provided in accordance with still another preferred embodiment of the present invention a bacterial electrolysis cell including a plurality of anodes and cathodes in liquid communication with a liquid to be purified located in a tank including an inlet for receipt of water to be purified, an outlet for output of purified water and an outlet for hydrogen gas, the plurality of anodes and cathodes being connected via an electrical circuit across an electrical power source, at least one of the anodes and cathodes including a metal electrical conductor arranged to be electrically coupled in an electrical circuit and an electrically conductive coating at least between the metal electrical conductor and a liquid in the cell, the electrically conductive coating operative to mutually seal the liquid and the electrical conductor from each other.

In accordance with a preferred embodiment of the present invention the bacterial electrolysis cell also includes at least one surface adapted for biofilm growth on a surface thereof which is in liquid communication with the liquid to be purified and is in electrical communication with the metal electrical conductor via the electrically conductive coating.

In accordance with a preferred embodiment of the present invention the plurality of cathodes each also includes an oxygen permeable, liquid-impermeable layer adjacent the electrically conductive coating, where the oxygen permeable, liquid-impermeable layer is exposed to an oxygen containing gas. Preferably, the oxygen permeable, liquid-impermeable layer includes an electrically conductive sheet. Alternatively the oxygen permeable, liquid-impermeable layer is formed of silicone rubber.

Preferably, the metal electrical conductor of at least one of the plurality of anodes is in the form of a foil.

Preferably, the metal electrical conductor is in the form of a wire grid. Alternatively, the metal electrical conductor is in the form of a perforated planar element. Alternatively, the metal electrical conductor is in the form of a generally parallel array of wires.

There is further provided in accordance with yet another preferred embodiment of the present invention an electrode for use in at least one of a bacterial fuel cell and an electrolysis cell, the electrode including a metal electrical conductor arranged to be electrically coupled in an electrical circuit and an electrically conductive coating at least between the metal electrical conductor and a liquid in the cell, the electrically conductive coating operative to mutually seal the liquid and the electrical conductor from each other.

In accordance with a preferred embodiment of the present invention the electrode includes at least one surface adapted for biofilm growth on a surface thereof which is in liquid communication with the liquid to be purified and is in electrical communication with the metal electrical conductor via the electrically conductive coating.

Preferably, the electrically conductive coating is adapted for biofilm growth on a surface thereof.

In accordance with a preferred embodiment of the present invention the at least one surface adapted for biofilm growth is defined by cylindrical surfaces of a multiplicity of elongate elements formed of conductive plastic and extending generally radially outwardly from the coated metal electrical conductor. Preferably, the coated metal electrical conductor is twisted to retain multiple ones of the multiplicity of elongate elements in bunches along an elongate extent thereof. Preferably, the elongate elements are non-metallic electrical conductors having electrical conductivity less than that of the coated metal electrical conductor. Preferably, the elongate elements are formed of conductive plastic. Alternatively, the elongate elements are formed of graphite fibers.

In accordance with a preferred embodiment of the present invention the at least one surface adapted for biofilm growth is defined by a multiple vane element surrounded by a loosely wound helical element formed of conductive plastic and extending generally radially outwardly from the coated metal electrical conductor.

In accordance with a preferred embodiment of the present invention the at least one surface adapted for biofilm growth is defined by a cylindrical element formed of conductive plastic around the coated metal electrical conductor.

Preferably, the coated metal electrical conductor is in the form of a wire. Alternatively, the coated metal electrical conductor is in the form of a cable. Alternatively, the coated metal electrical conductor is in the form of a rod.

In accordance with a preferred embodiment of the present invention the at least one surface adapted for biofilm growth is defined by a fabric overlying a surface of the electrically conductive coating.

In accordance with a preferred embodiment of the present invention the electrically conductive coating includes an electrically conductive sheet.

Preferably, the metal electrical conductor is in the form of a foil. Alternatively, the metal electrical conductor is in the form of a wire grid. Alternatively, the metal electrical conductor is in the form of a perforated planar element. Alternatively, the metal electrical conductor is in the form of a generally parallel array of wires.

Preferably, the metal electrical conductor is formed of copper or aluminum. Preferably, the electrically conductive coating is formed of a conductive plastic.

BRIEF DESCRIPTION OF THE DRAWINGS

The present invention will be understood and appreciated more fully from the following detailed description, taken in conjunction with the drawings in which.

DETAILED DESCRIPTION OF PREFERRED EMBODIMENTS

Figure 1:
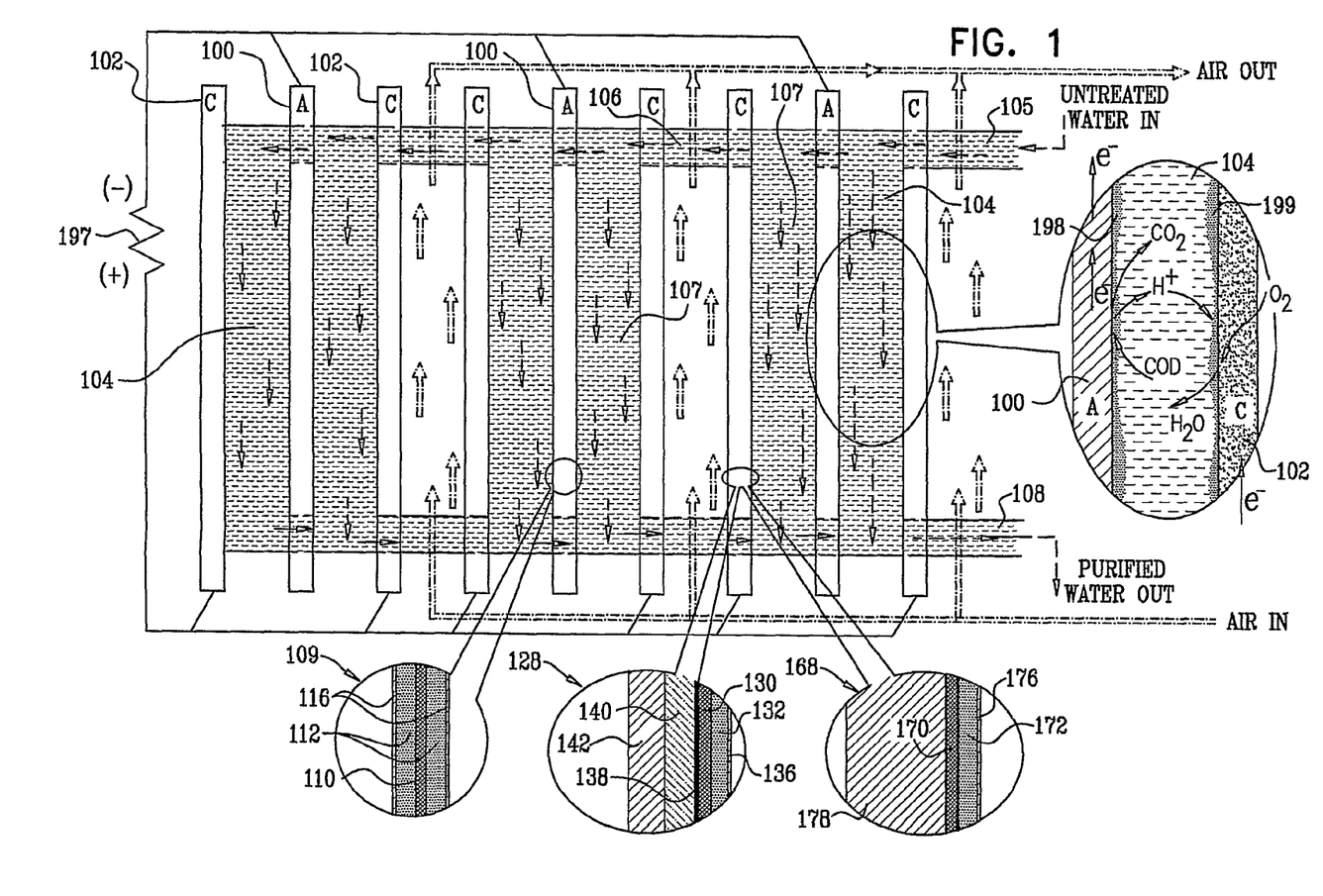
FIG. 1 is a simplified illustration of a bacterial fuel cell constructed and operative in accordance with a preferred embodiment of the present invention.

Reference is now made to FIG. 1, which is a simplified illustration of a bacterial fuel cell constructed and operative in accordance with a preferred embodiment of the present invention and including a plurality of anodes 100, each designated by the letter A and a plurality of cathodes 102, each designated by the letter C in liquid communication with a liquid 104 to be purified, such as industrial waste water. In the embodiment of FIG. 1, water to be purified is supplied at an inlet 105 which communicates via apertures formed in anodes 100 and cathodes 102 and conduits 106 defined between adjacent cathodes with a series of volumes 107 defined between adjacent anodes 100 and cathodes 102, which are sealed together, as by elastomeric seals (not shown) and with an outlet 108.

In accordance with an embodiment of the present invention, the anodes and cathodes may be formed as embossed elements similar in shape to those used in conventional plate heat exchangers. Examples of such a structure are shown in U.S. Pat. Nos. 4,014,385; 3,792,730; 3,731,737; 3,661,203; 2,787,446 and 2,550,339, the disclosures of which are hereby incorporated by reference.

In accordance with a preferred embodiment of the present invention, the plurality of anodes 100 and the plurality of cathodes 102 each include a metal electrical conductor surrounded by an electrically conductive coating.

The construction of each anode 100 is illustrated in an enlargement 109. It is seen that a metal conductor, preferably copper or aluminum, here designated by reference numeral 110, is surrounded by an electrically conductive coating.

In the illustrated embodiment, the electrically conductive coating is realized by laminating a pair of liquid impermeable conductive plastic sheets 112 so as to encase the metal conductor 110. Preferably sheets 112 are formed of a plastic such as polyethylene, polypropylene and PET, which is compounded with a conductive powder, such as carbon or graphite, to produce a conductive plastic sheet.

Biofilm growth is preferably supported on the outer surfaces of sheets 112. Optionally a biofilm growth support 116 is provided on at least one outer surface of sheets 112. Biofilm growth support 116 may be a fabric preferably formed of polyester or other suitable material.

Typical thicknesses of the various elements of the anode 100 are as follows:

| | |
|---|---|
| conductor 110 | 20-200 microns |
| sheet 112 | 50-400 microns |
| biofilm growth support 116 | 10-50 microns |

Figure 2A:
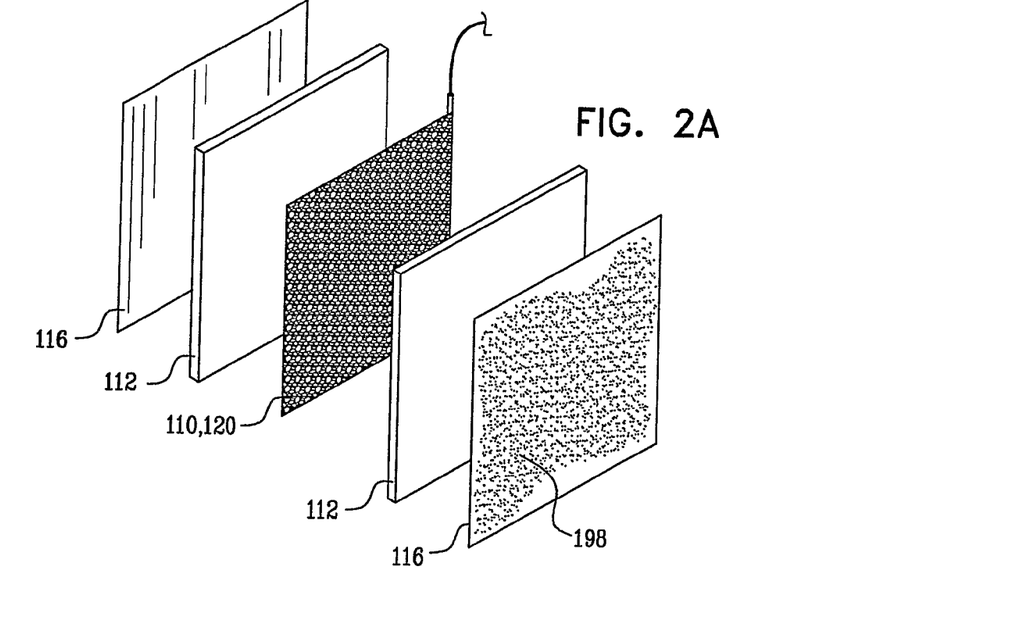
FIGS. 2A, 2B, 2C and 2D are simplified illustrations of four alternative embodiments of electrodes constructed and operative in accordance with a preferred embodiment of the present invention useful in a bacterial fuel cell and in a bacterial electrolysis cell.
Figure 2B:
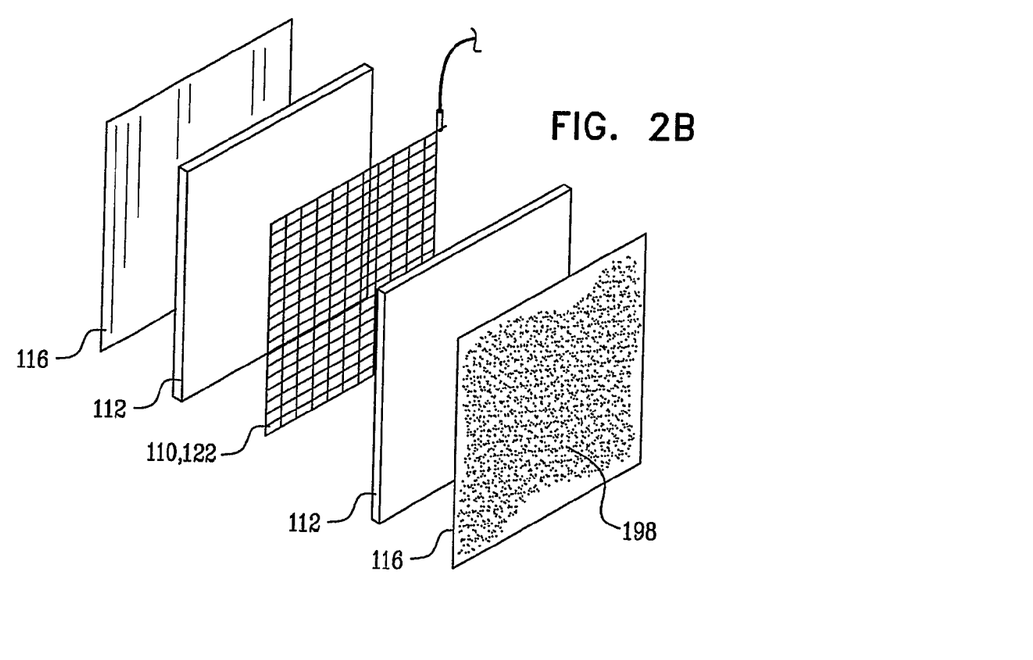
Figure 2C:
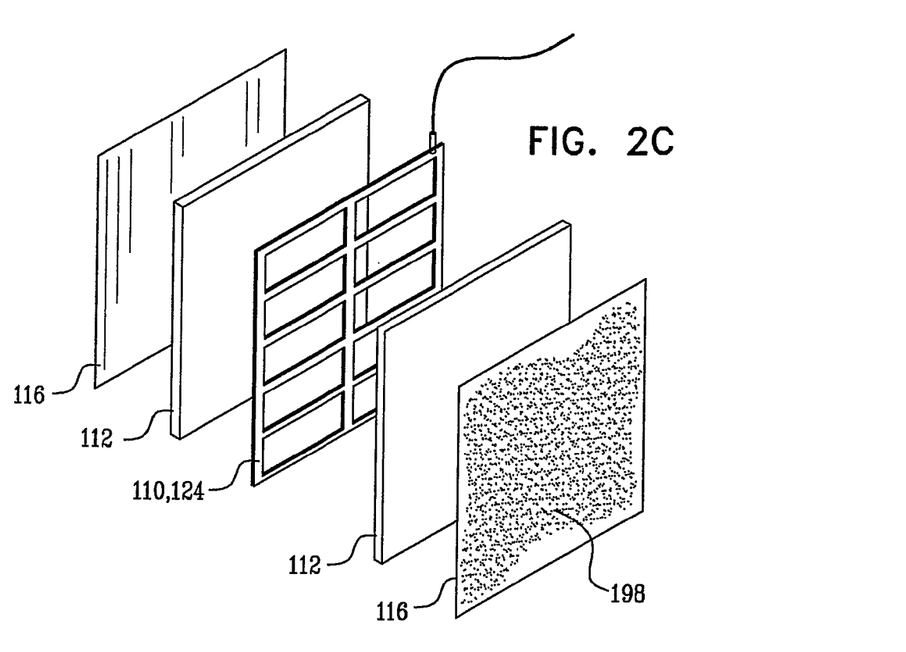
Figure 2D:
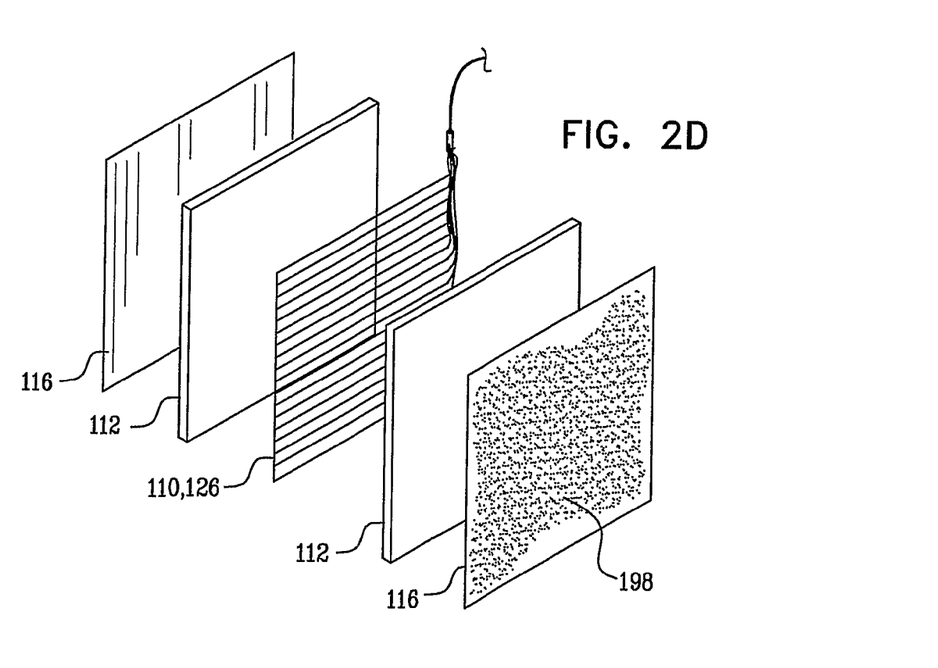

Four alternative embodiments of anode 100 are illustrated in FIGS. 2A-2D. In FIG. 2A, the conductor 110 is in the form of a foil and is designated by reference numeral 120. In FIG. 2B, the conductor 110 is in the form of a wire grid and is designated by reference numeral 122. In FIG. 2C, the conductor 110 is in the form of a perforated planar element and is designated by reference numeral 124. In FIG. 2D, the conductor 110 is in the form of a generally parallel array of wires and is designated by reference numeral 126.

One embodiment of the construction of each cathode 102 is illustrated in an enlargement 128. It is seen that a perforated metal conductor 130, preferably copper or aluminum, is surrounded by an electrically conductive coating.

In the illustrated embodiment, the electrically conductive coating is preferably realized by coating the metal conductor 130 with a liquid impermeable electrically conductive plastic and encasing the coated metal conductor on a liquid facing side thereof with a perforated sheet 132 formed of an electrically conductive plastic. Preferably the electrically conductive plastic is formed by compounding a plastic such as polyethylene, polypropylene and PET with a conductive powder, such as carbon or graphite.

Biofilm growth is preferably supported on the outer surfaces of coated conductor 130 and sheet 132. Optionally a biofilm growth support 136 is provided on at least one outer surface of sheet 132. Biofilm growth support 136 may be a fabric, preferably formed of polyester or other suitable material.

On an opposite, air-facing side of perforated conductive coated metal conductor 130 there is preferably provided an optional attachment layer 138 typically comprising a woven or non-woven fabric formed of plastic, such as a polyester. Outwardly of attachment layer 138 there is preferably provided a liquid-impermeable, oxygen-permeable layer 140, preferably formed of silicone rubber. Attachment layer 138 aids the attachment of oxygen permeable layer 140 to the coated conductor 130. Optionally outwardly of oxygen-permeable layer 140 there is provided a mechanical support layer 142, preferably a grid of relatively rigid plastic.

Typical thicknesses of the various elements of the cathode 102 shown in enlargement 128 are as follows:

| | |
|---|---|
| perforated coated conductor 130 | 100-600 microns |
| perforated sheet 132 | 50-400 microns |
| biofilm growth support 136 | 10-50 microns |
| attachment layer 138 | 10-50 microns |
| oxygen-permeable, liquid impermeable layer 140 | 50-500 microns |
| mechanical support layer 142 | 100-2000 microns |

Figures 3A, 3B, 3C:
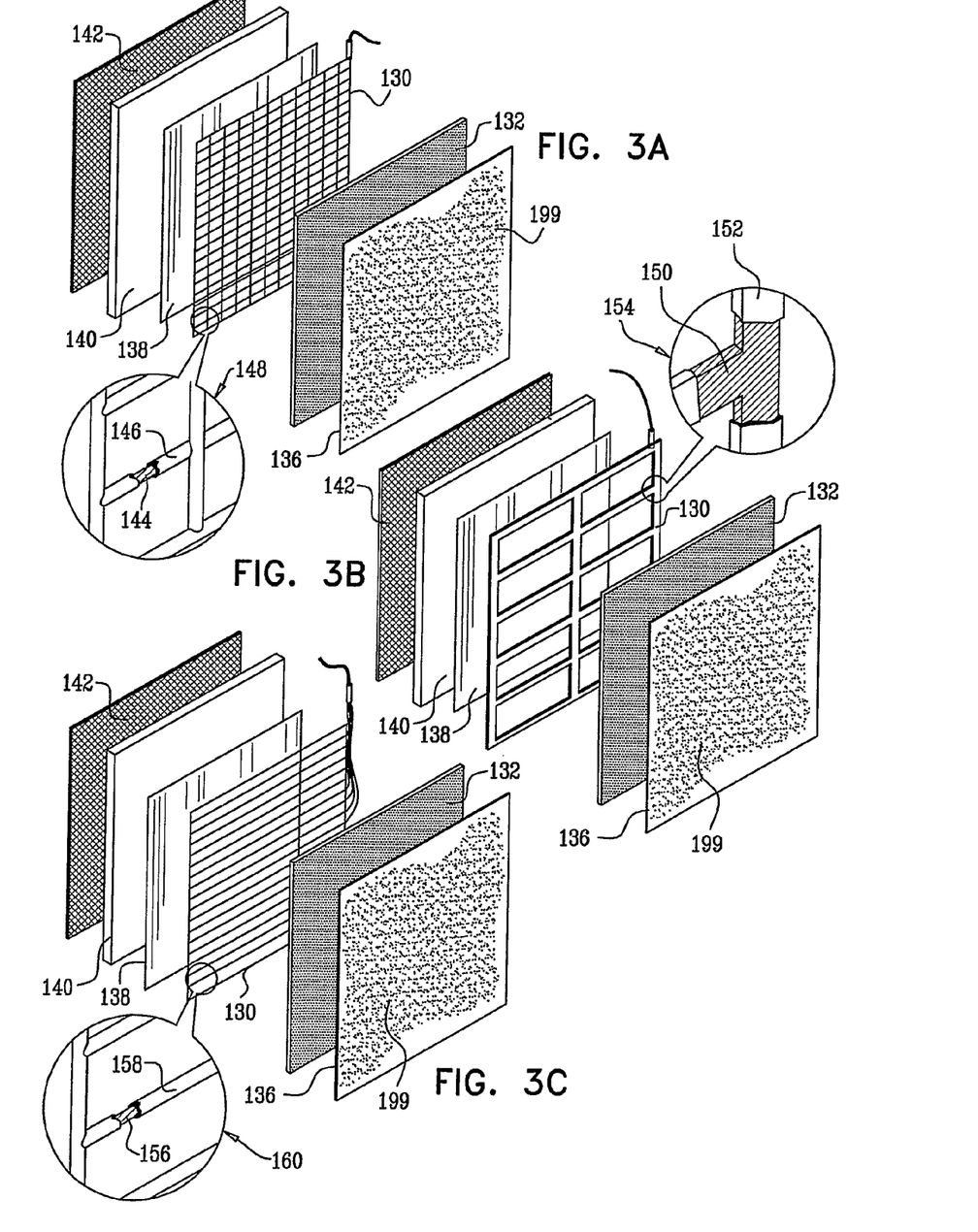
FIGS. 3A, 3B and 3C are simplified illustrations of three alternative embodiments of cathodes constructed and operative in accordance with a preferred embodiment of the present invention useful in a bacterial fuel cell.

Three alternative embodiments of the embodiment of the cathode shown in enlargement 128 are illustrated in FIGS. 3A-3C. In FIG. 3A, the perforated conductor 130 is in the form of a wire grid comprising wires 144, all of which are coated by a liquid impermeable electrically conductive coating 146, as seen in enlargement 148. In FIG. 3B, the perforated conductor 130 includes a perforated planar metal element 150, all of whose surfaces are coated by a liquid impermeable electrically conductive coating 152 as seen in enlargement 154. In FIG. 3C, the perforated conductor 130 is in the form of a generally parallel array of wires 156 all of which are coated by a liquid impermeable electrically conductive coating 158, as seen in enlargement 160.

Another embodiment of the construction of each cathode 102 is illustrated in an enlargement 168. It is seen that a perforated metal conductor 170, preferably copper or aluminum, is surrounded by an electrically conductive coating.

In the illustrated embodiment, the electrically conductive coating is preferably realized by coating the metal conductor 170 with a liquid impermeable electrically conductive plastic and encasing the coated metal conductor on a liquid facing side thereof with an oxygen-permeable, liquid-impermeable sheet 172 formed of an electrically conductive plastic. Preferably the electrically conductive plastic is formed by compounding a plastic such as polyethylene, polypropylene and PET with a conductive powder, such as carbon or graphite.

Biofilm growth is preferably supported on the outer surface of conductive sheet 172. Optionally a biofilm growth support 176 is provided on at least one outer surface of sheet 172. Biofilm growth support 176 may be a fabric, preferably formed of polyester or other suitable material.

On an opposite, air-facing side of perforated conductive coated metal conductor 170 there is optionally provided a mechanical support layer 178, preferably a grid of relatively rigid plastic.

Typical thicknesses of the various elements of the cathode 102 shown in enlargement 168 are as follows:

| | |
|---|---|
| perforated coated conductor 170 | 100-600 microns |
| oxygen-permeable sheet 172 | 50-400 microns |
| biofilm growth support 176 | 10-50 microns |
| mechanical support layer 178 | 100-2000 microns |

Figures 4A, 4B, 4C:
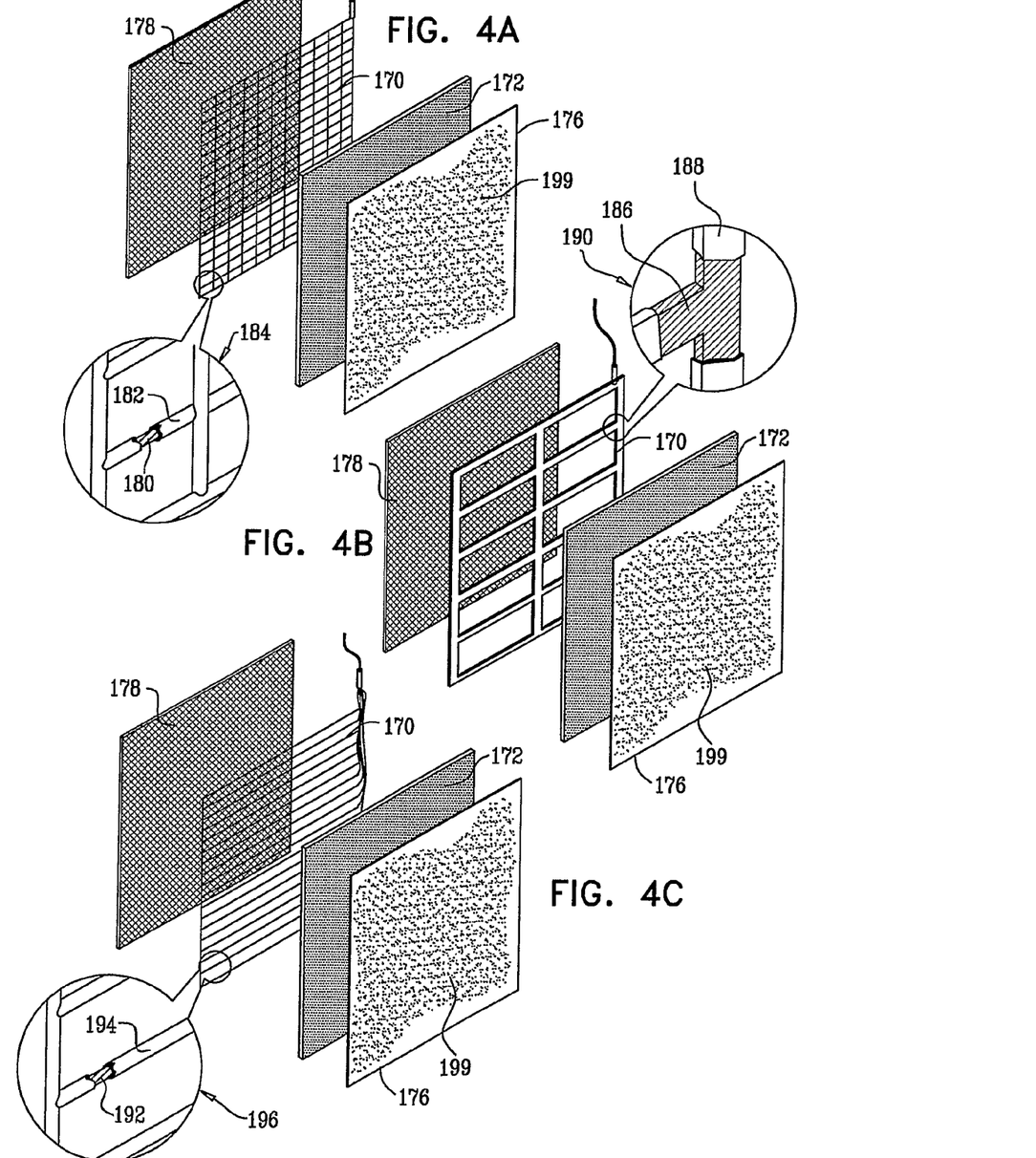
FIGS. 4A, 4B and 4C are simplified illustrations of three alternative embodiments of cathodes constructed and operative in accordance with another preferred embodiment of the present invention useful in a bacterial fuel cell.

Three alternative embodiments of the embodiment of the cathode shown in enlargement 168 are illustrated in FIGS. 4A-4C. In FIG. 4A, the perforated conductor 170 is in the form of a wire grid comprising wires 180, all of which are coated by a liquid impermeable electrically conductive coating 182, as seen in enlargement 184. In FIG. 4B, the perforated conductor 170 includes a perforated planar metal element 186, all of whose surfaces are coated by a liquid impermeable electrically conductive coating 188 as seen in enlargement 190. In FIG. 4C, the perforated conductor 170 is in the form of a generally parallel array of wires 192 all of which are coated by a liquid impermeable electrically conductive coating 194, as seen in enlargement 196.

As seen in FIG. 1, all of the anodes 100 and all of the cathodes 102 are electrically coupled in an electrical circuit across a load 197. In the bacterial fuel cell of FIG. 1, organic matter in the liquid 104, indicated as COD is oxidized by electrogenic bacteria, such as Geobacter and Shewanella, which typically reside in a biofilm 198, which preferably is supported by biofilm growth support 116 (enlargement 109) which is provided on the anodes 100.

This oxidation yields $CO_2$, protons and electrons. The protons diffuse through the liquid 104 towards cathodes 102 and the electrons are supplied by the bacteria to the anodes 100 and travel from the anodes through the electrical circuit to the cathodes 102.

In the cathodes 102 atmospheric oxygen $O_2$ permeates through the oxygen permeable layers, such as layer 140 (Enlargement 128) or 172 (Enlargement 168), to a conductive plastic layer on the cathode such as layer 132 (Enlargement 128) or 172 (Enlargement 168). At the water facing side of the conductive plastic layer the oxygen $O_2$ reacts with the protons and the electrons to produce water $H_2O$. This reaction typically requires catalysis which is preferably provided by a biofilm 199, which preferably is supported by biofilm growth support 136 (enlargement 128) or 176 (enlargement 168), preferably provided on the cathodes 102.

The operation of the bacterial fuel cell of FIG. 1 may thus be appreciated to provide both electrical power and purification of liquids having organic material therein.

Figures 5A, 5B:
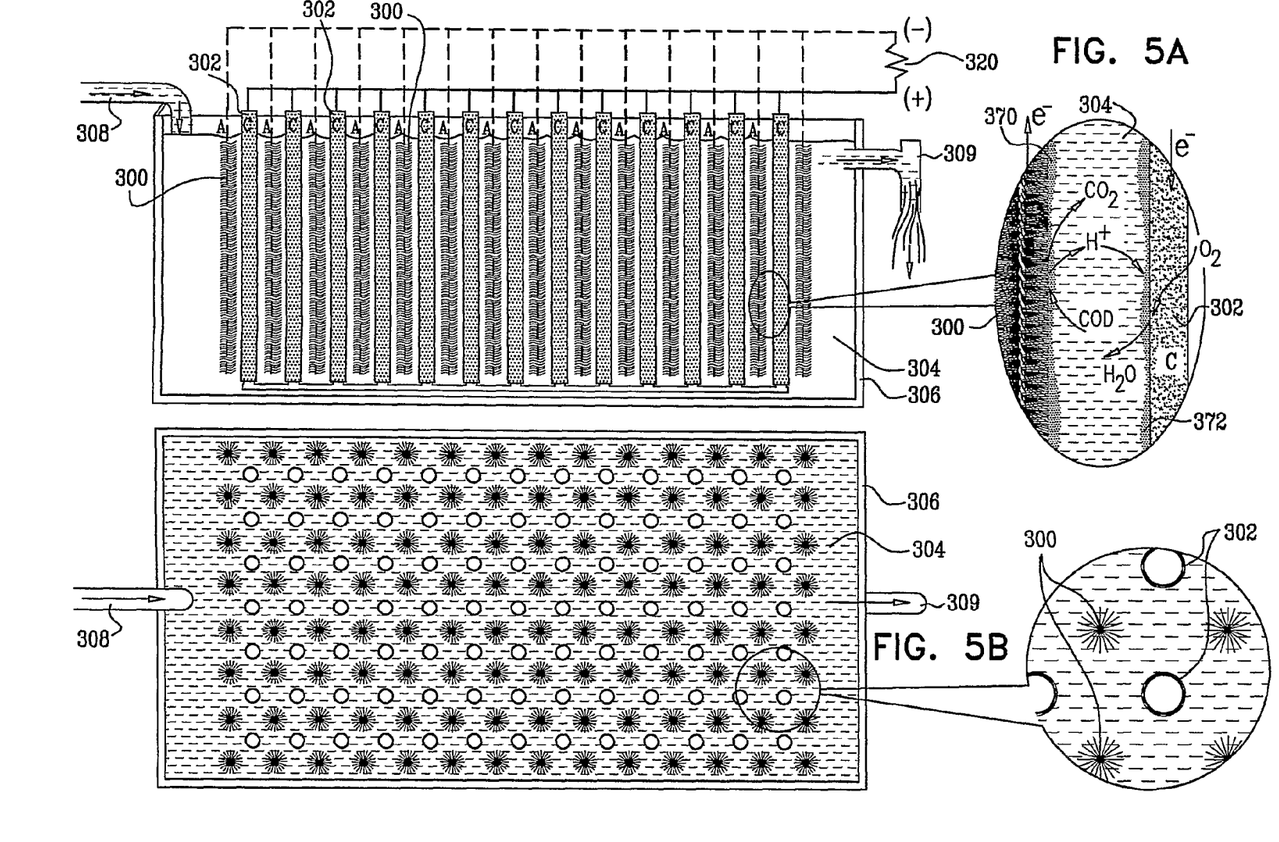
FIGS. 5A and 5B are respective simplified side and top view illustrations of a bacterial fuel cell constructed and operative in accordance with a preferred embodiment of the present invention.

Reference is now made to FIGS. 5A and 5B, which are simplified side and top view illustrations of a bacterial fuel cell constructed and operative in accordance with yet another preferred embodiment of the present invention and including a multiplicity of anodes 300, interspersed among a multiplicity of cathodes 302 in liquid communication with a liquid 304 to be purified, such as industrial waste water. The anodes 300 and cathodes 302 are located in a tank 306 having an inlet 308 for receipt of water to be purified and an outlet 309 for output of purified water. Circulation of water 304 in tank 306 is preferably provided by a suitable agitator or pump (not shown). Low pressure atmospheric oxygen $O_2$ is preferably blown through the interior of cathodes 302 by a fan (not shown).

Figure 6:
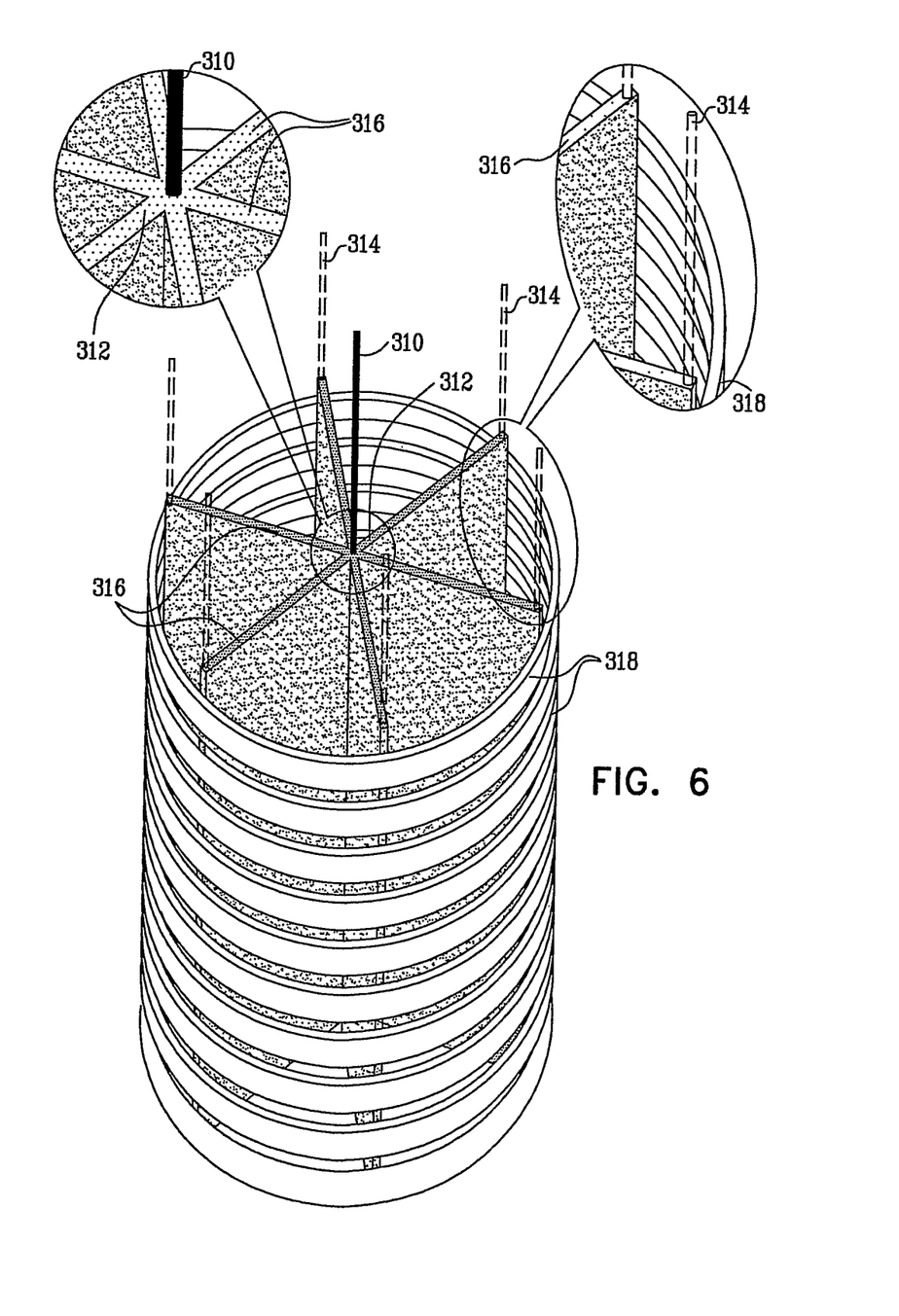
FIG. 6 is a simplified pictorial illustration of an electrode constructed and operative in accordance with a preferred embodiment of the present invention useful in a bacterial fuel cell and in a bacterial electrolysis cell.

Reference is also made to FIG. 6 which illustrates a preferred embodiment of an anode 300 useful in the bacterial fuel cell of FIGS. 5A and 5B. As seen in FIG. 6 a central elongate metal conductor 310, preferably a wire, cable or rod formed of copper or aluminum is molded into and extends outwardly from a radially extending multiple vane element 312 such that element 312 provides a liquid-impermeable electrically conductive coating for conductor 310. Optionally additional elongate conductors 314 may be molded into and extend outwardly from radially outward ends of one or more vanes 316 of element 312 such that element 312 provides a liquid-impermeable electrically conductive coating for conductors 314. Element 312 is preferably formed of a liquid-impermeable conductive plastic, such as polyethylene, polypropylene and PET, which is compounded with a conductive powder, such as carbon or graphite.

A circumferential electrode portion 318 is preferably located about the radially outward ends of vanes 316 and is preferably formed as a loosely wound helical element, of conductive plastic, which allows relatively free communication of liquid with surfaces of element 312. Preferably, element 312 and circumferential electrode portion 318 are formed as a unitary element by an extrusion process. Optionally some or all of the surfaces of element 312 and of electrode portion 318 are coated with a conductive powder or conductive fibers (not shown) formed of carbon or graphite. The surfaces of element 312 and of electrode portion 318 preferably all serve to support biofilm growth and to enable generation of electricity and purification of liquid 304.

Figure 7:
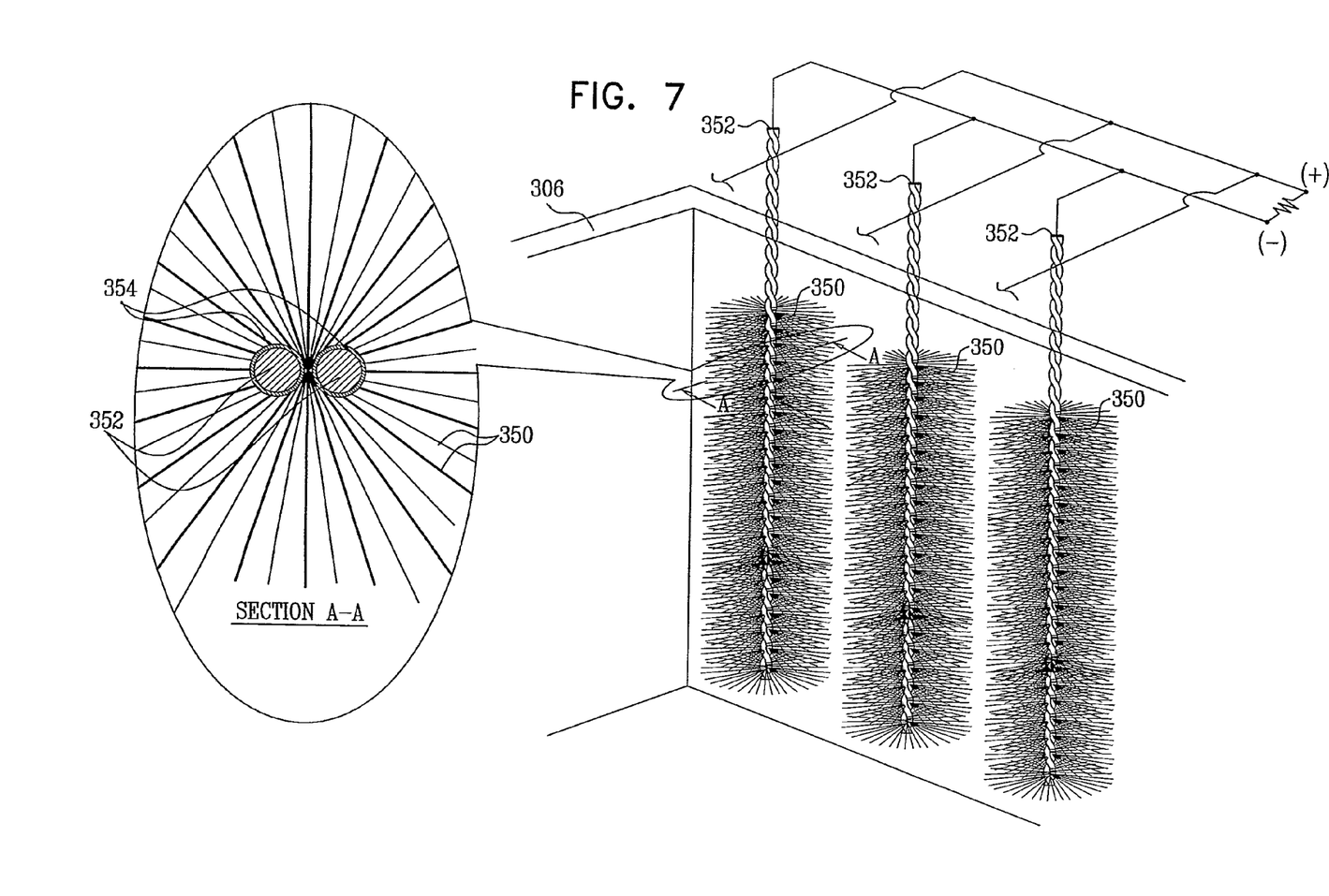
FIG. 7 is a simplified pictorial illustration of an electrode constructed and operative in accordance with a preferred embodiment of the present invention useful in a bacterial fuel cell.

Reference is now made to FIG. 7, which illustrates an electrode assembly which is useful, inter alia, as an anode 300 in the bacterial fuel cell of FIGS. 5A and 5B. As seen in FIG. 7, the electrode assembly preferably comprises a brush-like structure wherein a multiplicity of elongate conductive elements 350 are retained by and extend generally radially outwardly from a twisted metal electrical conductor 352 which is coated with a liquid-impermeable electrically conductive coating 354, preferably electrically conductive plastic. Preferably, electrically conductive plastic is formed by compounding a plastic such as polyethylene, polypropylene and PET with a conductive powder, such as carbon or graphite.

Elements 350 are preferably formed of a conductive plastic or alternatively may be graphite fibers. Twisted conductor 352 is preferably formed of a metal such as copper or aluminum. The surfaces of coated conductor 352 and of elements 350 preferably all serve to support biofilm growth and to enable generation of electricity and purification of liquid 304 when conductor 352 is connected to an electrical load as illustrated.

Preferably, the radially outer tips of elements 350 may be coated with an electrically insulative material (not shown), such as a silicon rubber material, in order to prevent inadvertent short circuiting between adjacent electrodes.

Figure 8:
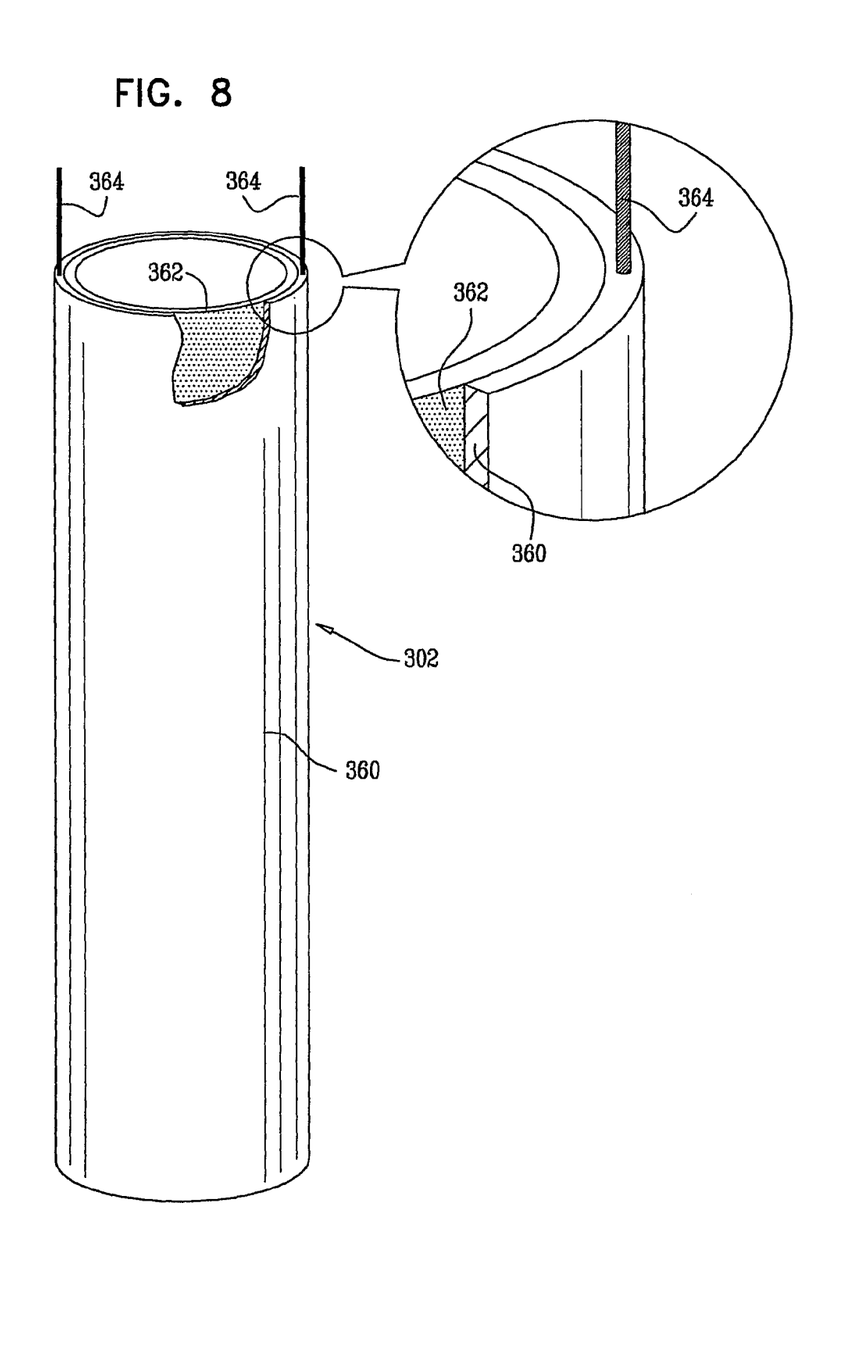
FIG. 8 is a simplified illustration of a cathode constructed and operative in accordance with another preferred embodiment of the present invention useful in a bacterial fuel cell.

Reference is now made to FIG. 8, which illustrates a preferred cathode 302 useful in the bacterial fuel cell of FIGS. 5A and 5B. Cathode 302 preferably comprises a cylinder 360 formed of a perforated or porous electrically conductive plastic such as polyethylene, polypropylene and PET, which is compounded with a conductive powder, such as carbon or graphite. Optionally some or all of the surface of cylinder 360 is coated with a conductive powder or conductive fibers (not shown) formed of carbon or graphite. The surface of cylinder 360 preferably serves to support biofilm growth and to enable generation of electricity and purification of liquid 304.

An exterior surface of cathode 302 is permeated by liquid 304 and an interior surface of cathode 302 is sealed from contact with liquid 304 by a liquid-impermeable, oxygen permeable coating 362 formed alongside an interior surface of cylinder 360. Coating 362 is preferably formed of silicone rubber. One or more elongate metal conductors 364, preferably a wire, cable or rod formed of copper or aluminum are preferably molded into and extend outwardly from cylinder 360 such that cylinder 360 provides a liquid-impermeable electrically conductive coating for conductors 364.

As seen in FIGS. 5A and 5B, all of the anodes 300 and all of the cathodes 302 are electrically coupled in an electrical circuit across a load 320. In the bacterial fuel cell of FIGS. 5A and 5B, organic matter in the liquid 304, indicated as COD is oxidized by electrogenic bacteria, such as Geobacter and Shewanella, which typically reside in a biofilm 370 which is supported on the anodes 300.

This oxidation yields $CO_2$, protons and electrons. The protons diffuse through the liquid 304 towards cathodes 302 and the electrons are supplied by the bacteria to the anodes 300 and travel from the anodes 300 through the electrical circuit to the cathodes 302.

In the cathodes 302 atmospheric oxygen $O_2$ permeates through the oxygen permeable layer, such as layer 362 (FIG. 8), to a conductive plastic layer on the cathode such as layer 360. At the water facing side of the conductive plastic layer 360, oxygen $O_2$ reacts with the protons and the electrons to produce water $H_2O$. This reaction typically requires catalysis which is preferably provided by a biofilm 372, preferably residing on the cathode 302.

The operation of the bacterial fuel cell of FIGS. 5A and 5B may thus be appreciated to provide both electrical power and purification of liquids having organic material therein.

It is appreciated that multiple ones of the bacterial fuel cells of the types shown and described hereinabove with reference to FIGS. 1-8 may be interconnected both hydraulically and electrically in series and/or parallel. Parallel interconnection increases the volume of water which is purified and provides increased current output, while series interconnection increases the extent of purification and provides increased voltage output. Various combinations of parallel and series connections may be advantageously utilized to provide optimal water treatment and electrical power production.

Figures 9A, 9B:
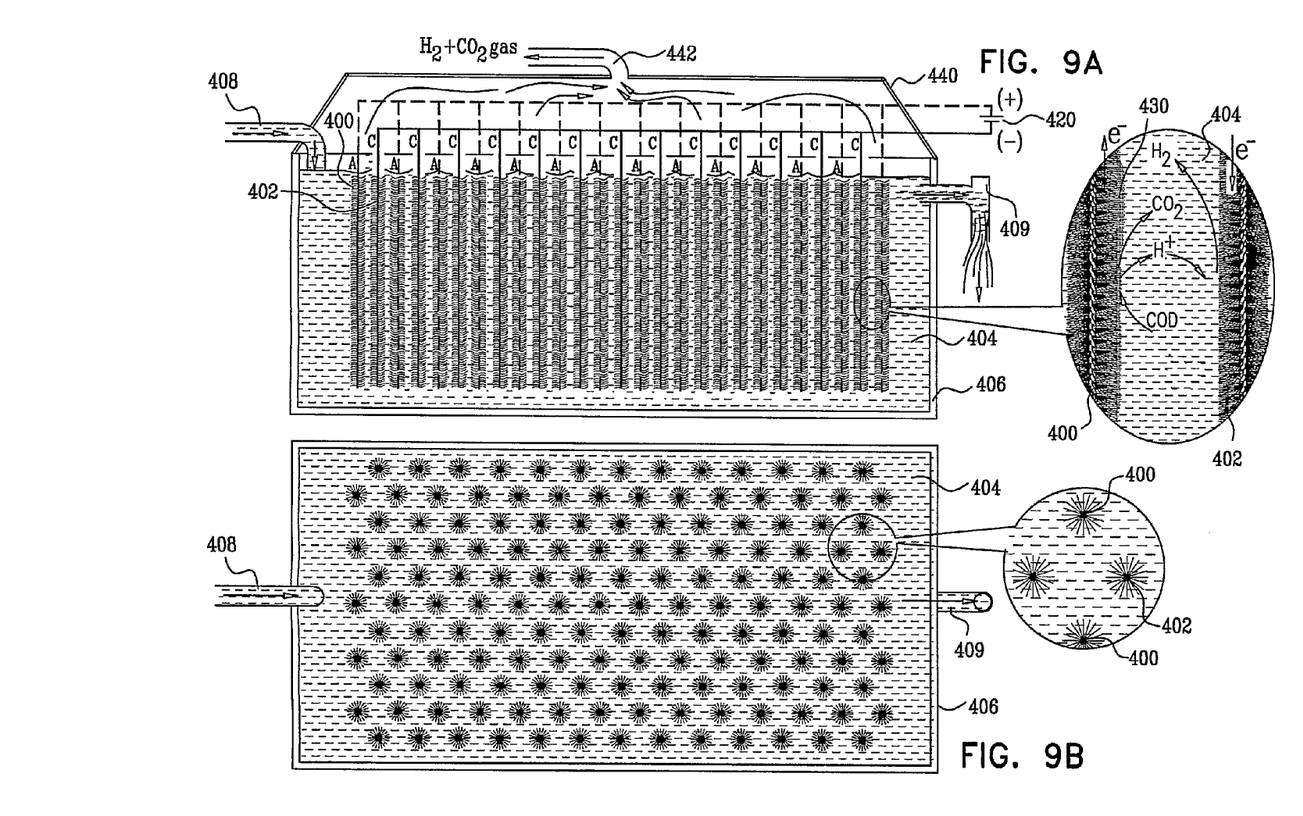
FIGS. 9A and 9B are respective simplified side and top view illustrations of a bacterial electrolysis cell constructed and operative in accordance with a preferred embodiment of the present invention.

Reference is now made to FIGS. 9A and 9B, which are respective simplified side and top view illustrations of a bacterial electrolysis cell constructed and operative in accordance with a preferred embodiment of the present invention.

The bacterial electrolysis cell of FIGS. 9A and 9B including a multiplicity of anodes 400, interspersed among a multiplicity of cathodes 402 in liquid communication with a liquid 404 to be purified, such as industrial waste water. The anodes 400 and cathodes 402 are located in a tank 406 having an inlet 408 for receipt of water to be purified and an outlet 409 for output of purified water. Circulation of water 404 in tank 406 is preferably provided by a suitable agitator or pump (not shown).

It is appreciated that the anodes 400 and the cathodes 402 may be structurally identical, as shown. In such a case, the anodes 400 and the cathodes 402 are differentiated from each other only by virtue of their electrical connection. Accordingly, the anodes 400 and the cathodes 402 may each be of the type shown in FIGS. 2A-2D or the type shown in FIG. 6 or the type shown in FIG. 7, or of any other suitable construction. Preferably, the anodes 400 are of the type shown in FIG. 6 and the cathodes are of the type shown in FIG. 7 or vice versa.

As seen in FIGS. 9A and 9B, all of the anodes 400 and all of the cathodes 402 are electrically coupled in an electrical circuit across an electrical power source 420. In the bacterial electrolysis cell of FIGS. 9A and 9B, organic matter in the liquid 404, indicated as COD, is oxidized by electrogenic bacteria, such as Geobacter and Shewanella, which typically reside in a biofilm 430 which is supported on the anodes 400.

This oxidation yields $CO_2$, protons and electrons. The protons diffuse through the liquid 404 towards cathodes 402 and the electrons are supplied by the bacteria to the anodes 400 and travel from the anodes through the electrical circuit to the cathodes 402.

In the cathodes 402 the protons are reduced to hydrogen gas H2 by the electrons driven by the electrical power source 420 through the electrical circuit. The hydrogen gas and the $CO_2$ are accumulated within a head space defined by a cover 440 overlying tank 406 and are drawn off at an outlet 442 and separated in a suitable manner.

The operation of the bacterial electrolysis cell of FIGS. 9A and 9B may thus be appreciated to provide hydrogen gas production at lower levels of electricity consumption than conventional processes as well as purification of liquids having organic material therein.

It will be appreciated by persons skilled in the art that the present invention is not limited to what has been particularly shown and described hereinabove. Rather the scope of the invention includes both combinations and subcombinations of the various features described hereinabove as well as modifications and variations thereof which would occur to persons skilled in the art upon reading the foregoing description and which are not in the prior art.

The invention claimed is:

1. A bacterial fuel cell comprising:
a plurality of anodes and a plurality of cathodes in liquid communication the entirety of the surface of with a liquid to be purified, said plurality of anodes and said plurality of cathodes each comprising:
a metal electrical conductor arranged to be electrically coupled across a load in an electrical circuit; and
an electrically conductive coating on the entirety of the surface of said metal electrical conductor, said electrically conductive coating being operative to mutually seal said liquid and said electrical conductor from each other;
wherein said metal electrical conductor is formed of copper or a copper alloy or aluminum or an aluminum alloy.

2. A bacterial fuel cell according to claim 1 and also comprising at least one surface adapted for biofilm growth on a surface thereof which is in liquid communication with said liquid to be purified and is in electrical communication with said metal electrical conductor via said electrically conductive coating.

3. A bacterial fuel cell according to claim 2 and wherein said at least one surface adapted for biofilm growth is defined by a fabric overlying a surface of said electrically conductive coating.

4. A bacterial fuel cell according to claim 1 and wherein said plurality of cathodes each also comprises an oxygen permeable, liquid-impermeable layer adjacent said electrically conductive coating and wherein said oxygen permeable, liquid-impermeable layer is exposed to an oxygen containing gas.

5. A bacterial fuel cell according to claim 4 and wherein said oxygen permeable, liquid-impermeable layer comprises an electrically conductive sheet.

6. A bacterial fuel cell according to claim 4 and wherein said oxygen permeable, liquid-impermeable layer is formed of silicone rubber.

7. A bacterial fuel cell according to claim 1 and wherein said metal electrical conductor is in the form of a wire grid, a perforated planar element or a generally parallel array of wires.

8. A bacterial fuel cell according to claim 1 and wherein at least one of said plurality of cathodes comprises an attachment layer.

9. A bacterial fuel cell according to claim 8 and wherein said attachment layer is formed of a plastic fabric.

10. A bacterial fuel cell according to claim 1 wherein:
apertures are formed in said plurality of anodes and cathodes;
said fuel cell also comprises:
conduits defined between adjacent ones of said plurality of cathodes; and
volumes defined between adjacent ones of said plurality of cathodes and said plurality of anodes providing communication of said liquid to be purified with said plurality of anodes and said plurality of cathodes;
said apertures provide communication of said liquid to be purified between said conduits and said volumes; and
said plurality of anodes and cathodes are sealed together.

11. A bacterial fuel cell according to claim 2 and wherein:
said metal electrical conductor is twisted to retain a multiplicity of elongate elements in bunches along an elongate extent thereof; and
said elongate elements are non-metallic electrical conductors having an electrical conductivity less than an electrical conductivity of said metal electrical conductor.

12. A bacterial fuel cell according to claim 1 and wherein said electrically conductive coating is formed of a conductive plastic.

13. A bacterial fuel cell according to claim 1 and wherein at least two of said cathodes are arranged adjacent each other and are separated from each other by a gap filled with an oxygen-containing gas.

* * * * *